United States Patent [19]
Obermaier et al.

[11] 3,719,082
[45] March 6, 1973

[54] AIR VELOCITY MEASURING SYSTEM

[75] Inventors: Alfred A. Obermaier, Barrington; Martin J. Pierman, Mount Prospect, both of Ill.

[73] Assignee: Alnor Instrument Company, Div. of Illinois Testing Laboratories, Inc., Chicago, Ill.

[22] Filed: March 29, 1971

[21] Appl. No.: 129,103

Related U.S. Application Data

[63] Continuation of Ser. No. 687,084, Nov. 13, 1967.

[52] U.S. Cl. ................................................73/202
[51] Int. Cl. ................................................G01f 5/00
[58] Field of Search........73/202, 203, 205, 211, 212, 73/194 R

[56] References Cited

UNITED STATES PATENTS

| | | | |
|---|---|---|---|
| 512,632 | 1/1894 | Thomson | 73/202 |
| 954,702 | 4/1910 | Rose | 138/46 |
| 1,813,100 | 7/1931 | Swindle | 73/211 UX |
| 1,946,275 | 2/1934 | Collins | 73/202 |
| 2,315,185 | 3/1943 | Boyle | 73/202 |
| 2,342,290 | 2/1944 | Miller | 73/202 |
| 2,624,199 | 1/1953 | Boyer | 73/202 |
| 3,474,669 | 10/1969 | Carter et al | 73/212 X |

FOREIGN PATENTS OR APPLICATIONS

| | | | |
|---|---|---|---|
| 997,727 | 9/1951 | France | 73/203 |
| 385,314 | 12/1923 | Germany | 73/202 |

*Primary Examiner*—James J. Gill
*Attorney*—I. Irving Silverman et al.

[57] ABSTRACT

An air velocity measuring system having a probe adapted to be placed into a flow of air and coupled to a measuring apparatus. The probe is specially constructed and precalibrated to track a pitot standard under varying static pressure conditions. The measuring apparatus may be a flow meter having a moving vane which is responsive to the air passing through the probe. In the preferred embodiment of the invention a range adjusting switch is coupled between the probe and the measuring apparatus and enables the system to have a plurality of ranges by placing a resistance, in the form of one of a plurality of needle valves, into the path of the air flow to the measuring apparatus. In the preferred embodiment, the probe, the range adjusting switch and the measuring apparatus are calibrated to form a system. Once calibrated, the individual elements of the system are interchangeable with the corresponding elements of other of similarly calibrated mass produced systems, without requiring subsequent recalibration of each system.

24 Claims, 7 Drawing Figures

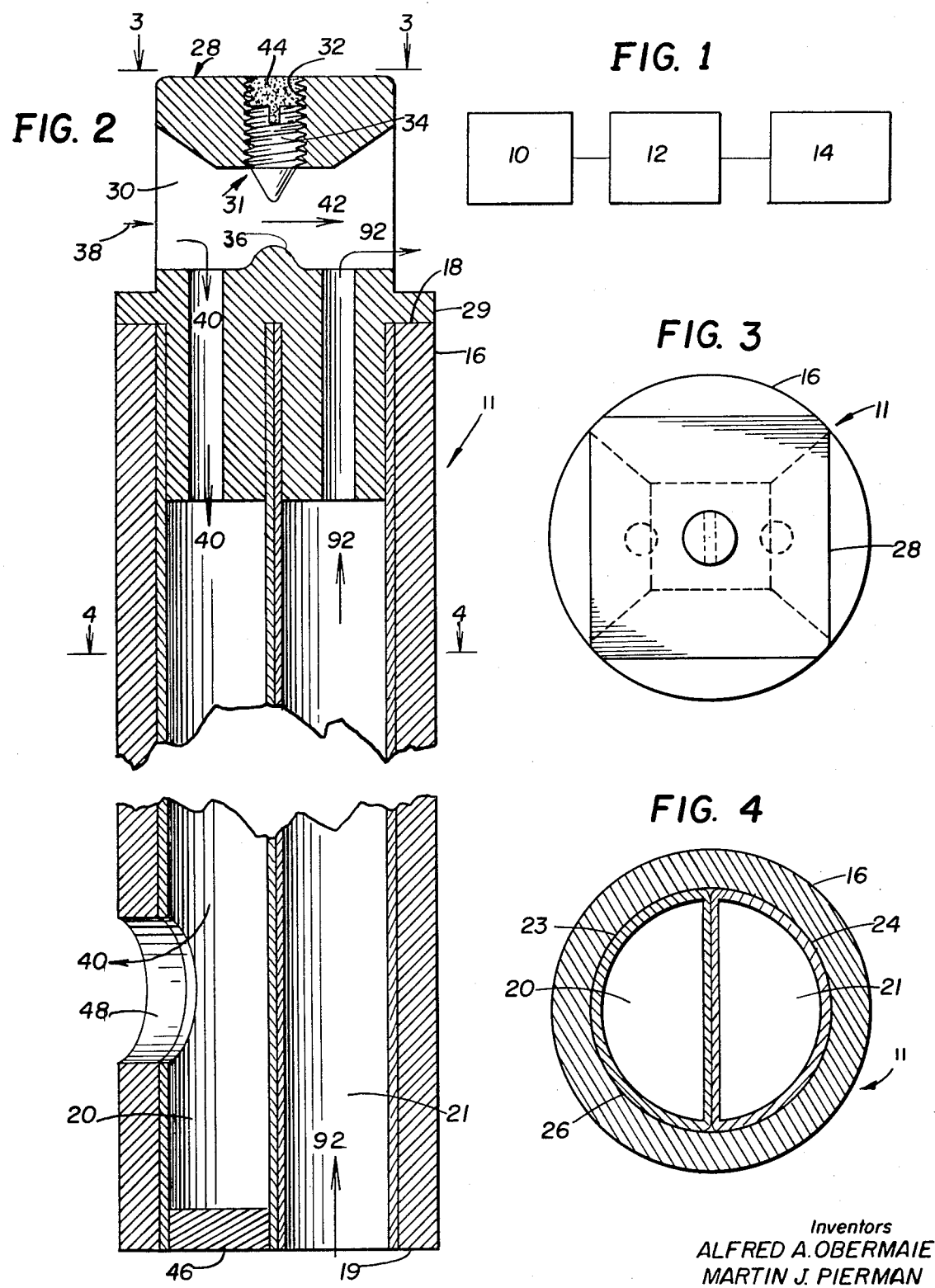

Inventors
ALFRED A. OBERMAIER
MARTIN J. PIERMAN

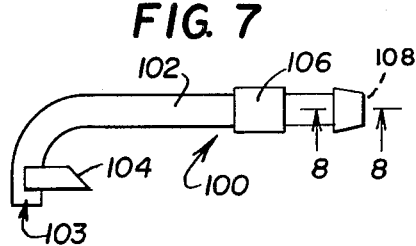
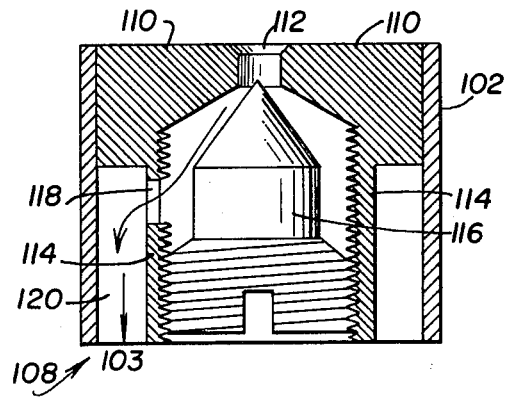
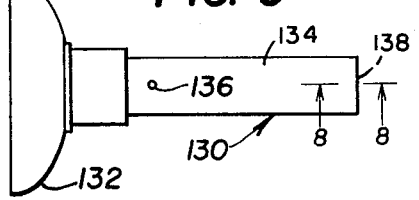
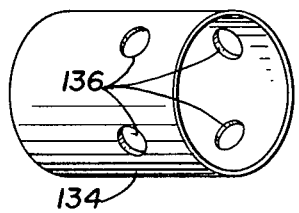
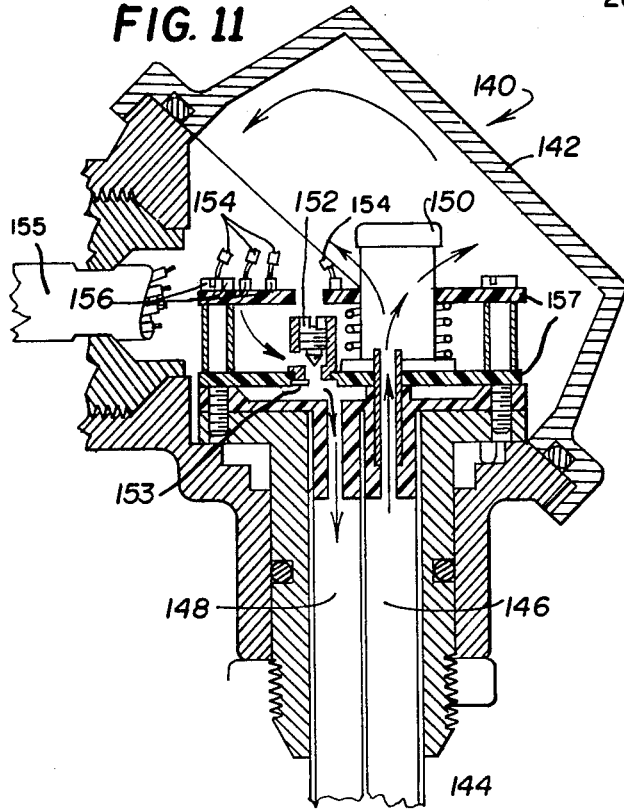
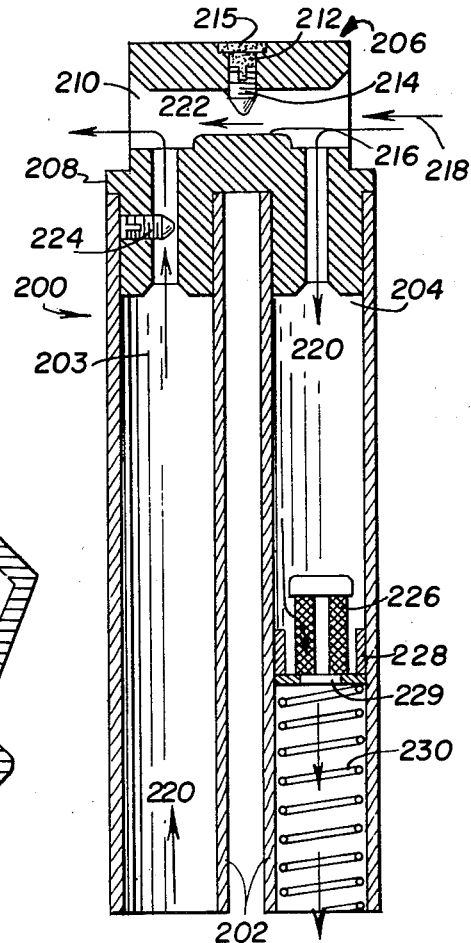

AIR VELOCITY MEASURING SYSTEM

CROSS REFERENCE TO RELATED APPLICATION

This application is a Continuation of our copending application entitled "Air Velocity Measuring System," Ser. No. 687 084, filed Nov. 13, 1967.

BACKGROUND OF INVENTION

This invention relates generally to an air velocity measuring system and components thereof and, in particular, to an air velocity measuring system comprising a plurality of interchangeable elements possessing a common calibration yet capable of standarized, mass production such that recalibration or matching of elements in any particular system is obviated.

Air velocity measuring systems are generally well known as a tool of heating, ventilating and air conditioning engineers and servicemen. Such measuring systems generally comprise an air flow meter, which has one or more accessories attached thereto. A typical air flow meter is shown in U.S. Pat. No. 2,690,671 to J. A. Obermaier et al, issued Oct. 5, 1954.

Jets and probes are used in combination with air flow meters to obtain air velocity readings. The jets and probes generally have an inlet and an outlet opening at each end. One end is coupled by suitable fittings to the meter; the other end is adapted to be inserted through the duct wall so that the air flow enters the inlet opening. There are a variety of jets to serve various purposes. Each jet is calibrated with respect to a specific air flow meter and an appropriate scale in inches of water is printed thereon.

The prior art air velocity measuring system require each specific probe, jet, and other types of accessory to be calibrated with a specific meter and for an appropriate scale to be printed on the meter. Each accessory or combination of accessories, once calibrated with a particular meter, cannot be used with any other meter. If an accessory is lost, damaged, or destroyed, the meter must be returned to the factory to have a new accessory calibrated with the meter. Also, if a customer requires a duplicate or a new accessory, the meter must be returned to the factory so that such accessory can be calibrated with the meter. Each accessory has a serial number which is printed on the meter with which it was calibrated.

When a meter is returned to the factory to have a lost accessory replaced, the scale representing the calibration of the lost accessory must be removed from the meter and a new scale printed thereon representing the calibration of the new accessory. The attempt to change scale designations frequently results in the obliteration of adjacent valid scale data; accordingly, it is common practice to have all of the scales redrawn when the meter is returned for a single correction. Necessarily, each time the meter is sent to the factory, the customer loses the use of the meter, which further increases his operating expenses. To obviate this lost time, some customers have found it necessary to obtain a spare meter and set of accessories for the spare meter; thus, further increasing operating overhead.

SUMMARY OF THE INVENTION

The air velocity measuring system made in accordance with this invention eliminates the problems and restrictions which are characteristic of prior art systems as above described, and is characterized by a primary embodiment which includes a probe which is calibrated to match a pitot static-tube standard. To differentiate this probe from prior art probes, we will refer to it as a "pitot probe."

The pivot probe comprises a conduit having a pair of parallel tubes and an air flow member having a passageway lying transverse to one end of the conduit and suitable for insertion into and parallel with a moving air stream. A fixed baffle and a variable baffle are positioned diametrically opposite each other within the air flow member so as to protrude into the passageway. The variable baffle is coaxial with the conduit, is adjustable, and preferably is in the form of a needle valve; so that a predetermined, calibrated portion of the air flowing into the passageway is channeled into one of the pair of tubes. After the pitot probe has been calibrated initially so that the pressure of the air channeled into one of the pair of tubes matches the pressure reading of the pitot static-tube standard, it will always match the pressure read by the pitot standard, for any velocity of air. Hence, the pitot probe never has to be calibrated again and the needle valve is sealed at the factory to prevent accidental change of its setting. The pitot probe may be used with any flow meter.

A range adjusting switch is interposed between the pitot probe and the measuring device; however, the pitot probe can be coupled directly to any suitable measuring device, including a thermo-transducer. The range adjusting switch has two separately defined passageways, positioned to mate with the two tubes of the pitot probe, and a rotatable plate carrying a plurality of needle valves which place different amounts of resistance within the air flow path through the measuring device, thereby extending its range in multiples of the full scale reading.

The pitot probe, range adjusting switch and measuring device are calibrated as a system at the factory. Once these elements are calibrated, they are interchangeable with like elements without requiring recalibration of the system. If a customer loses a pitot probe or switch, he no longer is required to send the measuring apparatus back to the factory to have it recalibrated with a new element as well as having the scales redrawn; he simply orders the new element, places it in the system and continues to make measurements.

Accordingly, the principal object of this invention is to provide a standarized air velocity measuring system comprising precalibrated components, interchangeable with system components and their replacements in a modular manner, thereby obviating component recalibration.

It is another object of this invention to provide a probe which traces a pitot static-tube standard.

It is a further object of this invention to provide a range adjusting switch which greatly expands the range of an air flow measuring device independent of the full scale calibration of such a device.

Many other objects will occur to those skilled in this art, as a detailed description of a preferred embodiment of the invention is set forth in connection with the accompanying drawings.

BRIEF DESCRIPTION OF THE DRAWINGS

FIG. 1 is a block diagram of an air velocity measuring system according to this invention and consists of a pitot probe, a range adjusting switch and a measuring apparatus;

FIG. 2 is a longitudinal section through one embodiment of the pitot probe constructed in accordance with the invention;

FIG. 3 is a top plan view taken along the line 3—3 of the probe structure illustrated in FIG. 2;

FIG. 4 is a cross-sectional view taken along the line 4—4 of the probe structure illustrated in FIG. 2;

DESCRIPTION OF THE PREFERRED EMBODIMENT

Figure 5:
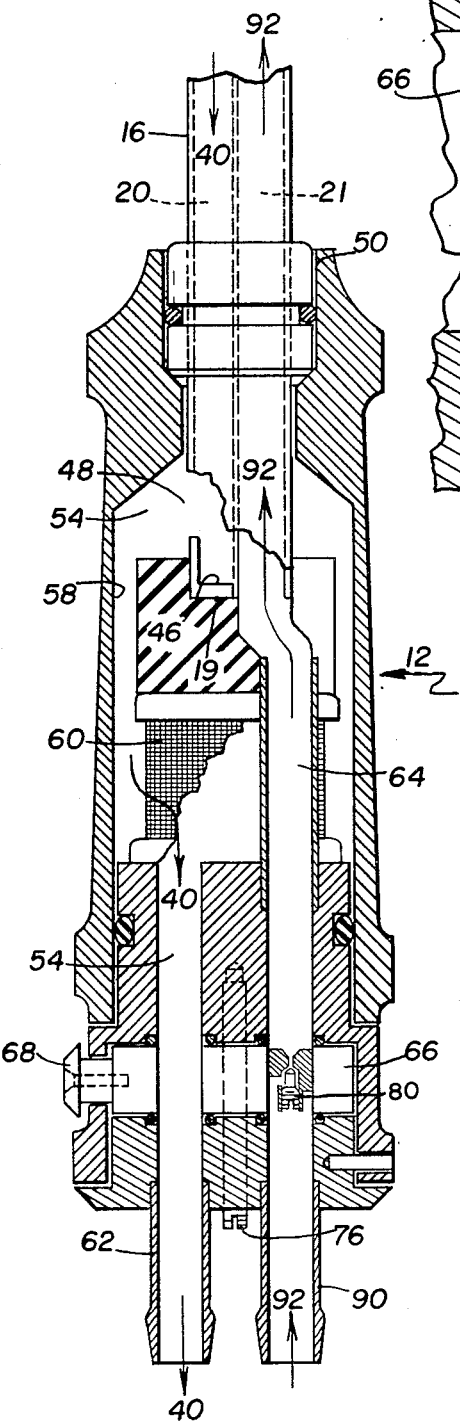
FIG. 5 is a longitudinal section through the range adjusting switch constructed in accordance with the invention.

Referring now to the drawings, FIG. 1 is a block diagram of the air velocity measuring system consisting of a pitot probe 10, a range adjusting switch 12 and a measuring device 14 suitable for measuring the velocity of air and having an input and output, integral therewith.

The pitot probe 10 is illustrated in detail in FIGS. 2, 3 and 4 and comprises a conduit 16, having two ends 18 and 19. A pair of tubes 20 and 21 of D-shape cross section are longitudinally positioned within the conduit 16 such that their respective arcuate surfaces 23 and 24 abut the interior wall 26 of the conduit 16. It will be appreciated that the conduit and tubes could also be defined by a unitary structure and that the tubes may have other than the preferred D-shape cross section.

An air flow control member 28 is telescoped into the conduit end 18 and seats thereagainst via an annular flange 29. The air flow member 28 is adjustable for initial calibration of the probe individually so that it then becomes a part of an air velocity system. A transverse passageway 30 extends through the control member 28. A variable baffle 31, which comprises a threaded bore 32 and a needle screw 34, is positioned in the member 28 coaxial with the conduit 16. The variable baffle 31 extends partially into the passageway 30. A fixed baffle 36 is positioned opposite the pointed end of the needle screw 34 so that an air stream as represented by the arrow 38 entering the passageway 30 is partially channeled into the tube 20 as represented in FIG. 2 by the arrow 40. The remaining part of the air stream, represented by an arrow 42, passes through the passageway 30.

The fixed baffle 36 and the variable baffle 31 are used in combination to calibrate the pitot probe 10 to a pitot statictube standard as described hereinafter. The air stream 38 entering the passageway 30 has a total pressure which consists of a velocity pressure and a static pressure. The velocity pressure component 40 is, diverted into the tube 20 primarily by the baffle 36; whereas, the variable baffle 31 is employed for fine adjustment of the air flow 40 into the tube 20 so that the velocity pressure of the channeled air stream 40 matches the pressure indicated by the pitot static-tube standard.

In order to calibrate the pitot probe 10, it and the pitot standard are independently connected to the same duct to monitor the velocity pressure of an air stream having a substantially constant velocity. The pitot static-tube measures the differential pressure, which is equivalent to the velocity pressure of the air stream. After the pitot probe has been matched by the adjustment of the variable baffle 31, so that the pressure of the air channeled into the tube 20 matches the pressure reading of the pitot static-tube standard, it will always match the pressure read by the pitot static-tube standard regardless of the velocity of the air stream. An epoxy seal 44 is applied to the screw 34 after the probe 10 has been calibrated, to fix its setting. The lower end of the tube 20 contains a plug 46 and a transverse aperture 48 which act to direct the air velocity pressure component outward from the probe to range adjusting switch 12, which is illustrated in FIG. 5, or directly to the measuring apparatus 14.

With reference to FIG. 5, the switch 12 has a receptacle 50 for receiving the end 19 of the conduit 16. A chamber 54 is defined within the switch 12 and communicates with the tube 20 via its aperture 48 so that the channeled air stream component 40 passes into the chamber 54. The conduit end 19 abuts a rubber bushing 56 which, in combination with an inner wall 58 of the switch 12, defines a continuation of the chamber 54 for the velocity component 40. A filter 60 is also positioned within switch 12 and is interposed within the chamber 54 so that channeled air stream component 40 passes therethrough. An air intake extension 62 forms the terminus of the chamber 54. A longitudinal return path chamber 64 extends the length of switch 12, is isolated from the chamber 54, and bypasses the filter 60.

A rotatable range switch plate 66 is mounted adjacent to the lower end of switch 12 and is rotatable therein by a spring biased knob 68. The range switch plate, which is shown in detail in FIG. 6A, has a plurality of peripheral apertures 70, 71, 72 and 73 which cooperate in pairs. Apertures 70 and 71 alternately communicate with the input passageway 54; whereas, the apertures 72 and 73 alternately communicate with the return path chamber 64. A central aperture 74 coacts with a compression screw 76 for securing and positioning the switch plate 66. It is to be understood that the apertures 70 and 71 alternately could communicate also with the return passageway 64, while the apertures 72 and 73 alternately communicate with the passageway 54.

Figure 6:
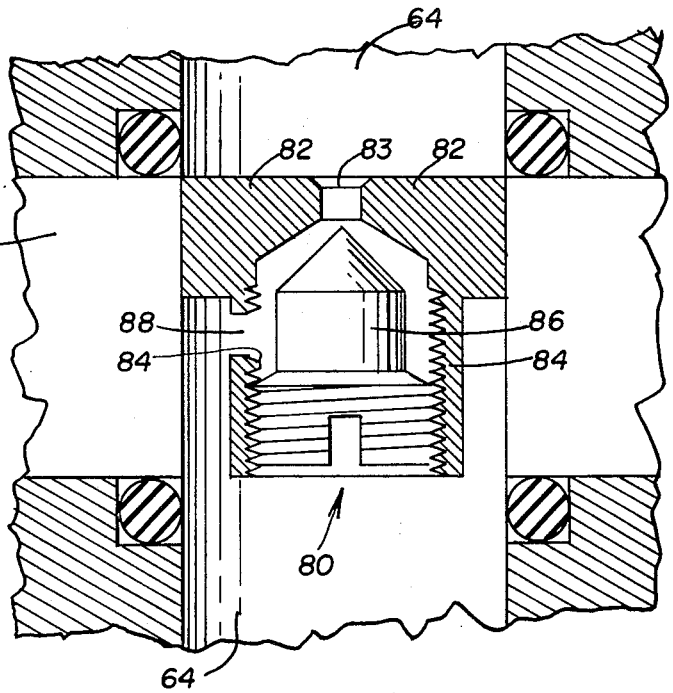
FIG. 6 is a partial cross section of the needle calibrating valve of the structure illustrated in FIG. 5.
Figure 6A:
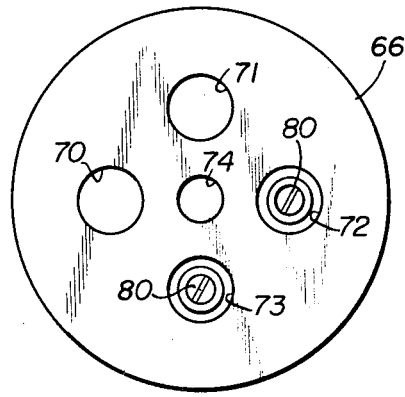
FIG. 6A is a plan view of the rotating switch plate illustrated in FIG. 5.

A needle valve 80, which is illustrated in detail in FIG. 6, is housed in each of the apertures 72 and 73. Each valve 80 contains a seat 82, which defines a first opening 83, and threaded portion 84, which extends outwardly therefrom for receiving a needle member 86. A second opening 88 in the threaded portion 84 communicates with the return path chamber 64.

An air return extension 90 forms the entrance to the chamber 64 and communicates with the output of the measuring device 14. The channeled air stream 40, which enters the measuring device 14 via the channel 54, returns through the switch 12 via the channel 64 and the probe 10 via the tube 21 and is designated by an arrow 92. Each of the needle valves 80 places a different precalibrated resistance into the path of the channeled air stream and thereby increases the range of the measuring apparatus 14 by specifically defined increments.

The return path 64 through the switch 12 and the tube 21 of the conduit 16 return the air velocity component 40 from the measuring device 14 to the air flow control member 28, where the component 40 combines with the static pressure air flow 42 and exits from the passageway 30.

In order to calibrate the pitot probe to match a pitot static-tube standard, the air velocity component 40 must be returned to its initial environment, so that a complete unitary system is maintained.

It is believed that the invention has been described in such detail as to enable those skilled in the art to understand the same, and it will be appreciated that variations or modifications may be made without departing from the spirit or scope of the invention.

What is desired to secure by Letters Patent in the United States is:

1. An air velocity probe which matches a pitot standard, comprising:

an air flow conduit having a first end constructed with two ports to be coupled, respectively, to the input and output of an air velocity measuring device having an input and an output, said conduit having an opposite end with two ports adapted to be positioned into communication with the total and static pressure components, respectively, of flowing air to be measured, preadjustable air flow control means positioned adjacent said opposite conduit end for regulating the flow of air through said air probe, wherein said air flow control means comprises:

an air flow control member affixed to said opposite end of said conduit, a passageway through said member transverse to said conduit, and a variable baffle disposed within said air flow control member and transverse to said passageway so that part of an air flow passing into said passageway is channeled into said opposite end of said conduit by way of said port that is in communication with the total pressure component, said opposite conduit end and said air flow control member being constructed and arranged for insertion into and positioned within the flowing air to be measured so as to be orthogonal at all times with respect to the flowing air, such that said transverse passageway will lie parallel to the flowing air, said air flow control means being constructed and arranged with respect to itself and said air flow conduit for the initial calibration of said probe to match it to a pitot standard, under varying static pressure conditions, and said preadjustable air flow control means being constructed to thereafter be inhibited from being adjusted.

2. An air velocity probe as defined in claim 1 in which said conduit comprises:

a pair of longitudinally extending and parallel tubes, one end of each tube communicating respectively with the input and output of the measuring device, and said air flow control means comprising an air flow control member having a total pressure side and a static pressure side respectively coupled to the other end of said tubes, there thus being defined a path for air to flow from said total pressure side, through one of said tubes, through the measuring device, through the other of said tubes, and to said static pressure side.

3. An air velocity probe as defined in claim 2 wherein said air flow control member includes:

a passageway through said member transverse to said tubes, and a variable baffle disposed within said air flow control member and transverse to said passageway.

4. An air velocity probe as defined in Claim 3 in which said air flow control member further includes:

a fixed baffle disposed within and transverse to said passageway and opposite to said variable baffle, said variable baffle and said fixed baffle being so disposed that part of an air flow passing into said passageway is channeled into said one tube for communicating with the input to the measuring device and the remainder of the air flow passes directly out through said control member to its static pressure side.

5. An air velocity probe as defined in claim 4 in which said variable baffle comprises:

a threaded bore coaxial with said conduit and communicating with said passageway through said member, and a needle screw coacting with said threaded bore and arranged to extend into said passageway.

6. An air velocity probe as defined in claim 5 wherein:

the pitot standard to which said air probe is matched is a pitot static-tube and that matching is effective over a dynamic range of air velocity, such that the defined construction of said air probe, which provides for the dynamic range matching, defines a pitot probe.

7. An air velocity probe as defined in claim 5 which further includes:

preset range selecting means coupled in air flow communication to said first and second tubes and including switchable air resistance means for further regulation of the air flow through said air probe to the measuring device.

8. An air velocity probe as defined in claim 1 in which said variable baffle comprises:

a threaded bore coaxial with said conduit and communicating with said passageway through said member, and a needle valve coacting with said threaded bore for extending partially into said passageway, and said air probe further comprises a fixed baffle disposed within and transverse to said passageway and opposite to said variable baffle.

9. An air velocity probe as defined in claim 1 in which said conduit and air flow control member combine to form a narrow and elongated air probe having parallel sides and a small cross section for direct and orthogonal insertion into the flowing air to be measured.

10. An air velocity probe as defined in claim 1 in which said transverse passageway has a length which defines the width of said air flow control member, said opposite conduit end has a width substantially equal to that width of said air flow control member and oriented parallel to said passageway, and said conduit and said air flow control member in combination have a length many times greater than their said widths.

11. The air velocity probe as defined in claim 1, and in combination therewith a range adjusting switch, said switch having one end communicating with said air probe and other end adapted to communicate with a measuring device, said switch comprising:

a receptacle for interconnection with said air probe, a first chamber communicating with said receptacle for air flow to the input of a measuring device, a second chamber communicating with said receptacle for air flow returning from such measuring device, and an air flow restrictive member positioned in one of said chambers to regulate the air flow through such measuring device.

12. The combination defined in claim 11 wherein said range adjusting switch further comprises:

a plurality of restrictive members and mechanical means for placing a selected one of said restrictive members in one of said chambers to regulate the air flow through a measuring device.

13. The combination defined in claim 12 in which, each said restrictive member is a valve preset to a different air flow regulating value and said mechanical placing means is a rotatable disc coaxial with said chambers and has pairs of axial ducts, with one duct of each pair housing one of said valves.

14. An air velocity measuring system comprising:

an air velocity probe which includes a conduit having a first end which is to be inserted orthogonally into a flow or air, a precalibratible air flow control means affixed to said first end, a second end which is to be coupled to an air velocity measuring device, and a pair of air paths between said ends;

said air flow control means is constructed to include a total pressure input side and a static pressure side, respectively, in orthogonal air flow connection with said pair of air paths and also in direct air flow connection to one another;

an air velocity measuring device having an air flow input and output respectively associated with said pair of air paths of said conduit;

a measuring device range adjusting switch interposed between said air probe and said measuring device and having separate input and output paths which mate this said pair of air paths and said air flow input and output, respectively, to complete a continuous air flow route through said air probe, range switch and measuring device, with the only air flow entrance and exit for the system being at said sides of said air flow control means;

said air flow control means being constructed and arranged with respect to itself and said system for the calibration of said air probe and said system to match their responses to a pitot standard under varying static pressure conditions as seen at said static pressure side.

15. An air velocity measuring system as defined in claim 16 wherein said air flow control means includes:

a needle valve which, in combination with said conduit, defines an air flow channel for communication with said input path of said switch, said air flow channel, by calibration of said needle valve, being subject to receive a calibrated portion of the total pressure component of the air flow to be measured, the remainder of the total pressure component passing directly through said air flow control means to said static pressure side thereof.

16. An air velocity measuring system as defined in claim 15 in which said range adjusting switch includes:

at least one air flow restriction member selectively positionable into one of said paths of said range adjusting switch.

17. An air velocity measuring system as defined in claim 16 which includes a passageway through said air flow control means, through which said remainder of the total pressure component flows and in which said needle valve is housed.

18. An air velocity measuring system as defined in claim 17 in which said passageway has a length which defines the width of said air flow control means, said first conduit end has a width substantially equal to that width of said air flow control means and oriented parallel to said passageway, and said conduit and said air flow control means in combination have a length many times greater than their said widths.

19. An air velocity measuring system as defined in claim 14 wherein said range adjusting switch further comprises:

a plurality of air restrictive members and mechanical means for placing a selected one of said restrictive members in one of said switch paths to regulate the air flow through said measuring device.

20. An air flow measuring system as defined in claim 19 in which, each said restrictive member is a valve preset to a different air flow regulating value and said mechanical placing means is a rotatable disc coaxial with said switch paths and has pairs of axial ducts, with one duct of each pair housing one of said valves.

21. An air velocity measuring system as defined in claim 14 wherein said air flow control means further comprises:

a passageway through said control means and transverse to said conduit, and a variable baffle disposed within said air flow control means and transverse to said passageway, so that part of an air flow passing into said passageway is channeled into said first end of said conduit by way of said total pressure input side.

22. An air velocity measuring system as defined in claim 21 in which said variable baffle comprises:

a threaded bore coaxial with said conduit and passing into said passageway, and a needle valve coacting with said threaded bore for extending partially into said passageway, and said air probe further comprises a fixed baffle disposed within and transverse to said passageway and opposite to said variable baffle.

23. An air velocity measuring system as defined in claim 22 in which said conduit and air flow control means combine to form a narrow and elongated air probe having parallel sides and a small cross section for direct and orthogonal insertion into the following air to be measured.

24. An air velocity measuring system as defined in claim 23 in which said range adjusting switch includes:

at least one air flow restriction member selectively positionable into one of said paths of said range adjusting switch.

* * * * *